United States Patent
Kudo

(10) Patent No.: US 9,044,855 B2
(45) Date of Patent: Jun. 2, 2015

(54) PROCESSING CONTEXT INFORMATION

(75) Inventor: Michiharu Kudo, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/527,620

(22) Filed: Jun. 20, 2012

(65) Prior Publication Data

US 2012/0328092 A1 Dec. 27, 2012

(30) Foreign Application Priority Data

Jun. 22, 2011 (JP) .................................. 2011-138026

(51) Int. Cl.
*H04L 9/08* (2006.01)
*H04L 9/32* (2006.01)
(Continued)

(52) U.S. Cl.
CPC ............. *B25J 9/0003* (2013.01); *H04L 9/0891* (2013.01); *G06F 21/6218* (2013.01); *G06F 21/6254* (2013.01); *H04L 9/0894* (2013.01);
(Continued)

(58) Field of Classification Search
CPC ... H04L 9/0891; H04L 9/3226; H04L 9/3231; H04L 63/0861; G06F 21/32; G06F 21/62; G06F 21/6245; G06F 21/6254
USPC .................. 380/277; 713/182, 186, 185, 165; 726/26; 382/115, 118; 704/273, 246; 709/219, 217; 901/46, 47
See application file for complete search history.

(56) References Cited

U.S. PATENT DOCUMENTS 7,269,480 B2 * 9/2007 Hashimoto et al. ........... 700/259
7,508,941 B1 3/2009 O'Toole et al.
(Continued)

FOREIGN PATENT DOCUMENTS

JP H091370 A 1/1997
JP 2002308637 A 10/2002
(Continued)

OTHER PUBLICATIONS

Evans, et al., "Context-Derived Pseudonyms for Protection of Provacy in Transport Middleware and Applications," PERCOMW '07 Proceedings of the Fifth IEEE International Conference on Pervasive Computing and Communications Workshops, IEEE Computer Society Washington. DC, USA, pp. 1-6, 2007.
(Continued)

*Primary Examiner* — Zachary A Davis
(74) *Attorney, Agent, or Firm* — Jeff Tang; Michael J. Chang, LLC

(57) ABSTRACT

A system for generating contexts of targets to estimate a high-order context is provided. The system includes: a detection device including: a sensor for detecting a target; a module for extracting the target and a primary context of the target based on data detected by the sensor; and a module for encrypting the primary context with a key corresponding to the target; a storage device for recording encrypted primary context from the detection device; and a processing device including: a module for receiving the encrypted primary context from the storage device; a module for receiving the key corresponding to the target involved in the encrypted primary context; a module for decrypting the encrypted primary context using the received key; and a module for estimating a high-order context using the decrypted primary context, where the processing device further includes a module for requesting the detection device to delete information on a key corresponding to a specific target.

10 Claims, 16 Drawing Sheets

(51) Int. Cl.
  *G06F 21/62* (2013.01)
  *B25J 9/00* (2006.01)
  *B25J 11/00* (2006.01)

(52) U.S. Cl.
  CPC ......... *H04L2209/42* (2013.01); *H04L 2209/60* (2013.01); *H04L 2209/805* (2013.01); *B25J 11/008* (2013.01)

(56) References Cited

U.S. PATENT DOCUMENTS

| | | | |
|---|---|---|---|
| 7,600,119 B2 * | 10/2009 | Takano | 713/168 |
| 7,720,572 B2 * | 5/2010 | Ziegler et al. | 700/245 |
| 7,916,328 B2 | 3/2011 | Miyamura et al. | |
| 8,583,282 B2 * | 11/2013 | Angle et al. | 700/245 |
| 8,811,607 B2 * | 8/2014 | Kudoh | 380/28 |
| 2005/0004710 A1 | 1/2005 | Shimomura et al. | |
| 2006/0249010 A1 | 11/2006 | John et al. | |
| 2007/0165273 A1 | 7/2007 | Miyamura et al. | |
| 2007/0291682 A1 * | 12/2007 | Anjum | 370/328 |
| 2008/0184375 A1 * | 7/2008 | Nonaka et al. | 726/27 |
| 2008/0269949 A1 | 10/2008 | Norman et al. | |
| 2011/0022851 A1 | 1/2011 | Yokota et al. | |
| 2012/0106738 A1 | 5/2012 | Belenkiy et al. | |
| 2012/0139750 A1 * | 6/2012 | Hayakawa et al. | 340/870.03 |
| 2012/0163206 A1 | 6/2012 | Leung et al. | |
| 2012/0197464 A1 * | 8/2012 | Wang et al. | 701/2 |
| 2012/0316676 A1 * | 12/2012 | Fouillade et al. | 700/246 |
| 2013/0111205 A1 | 5/2013 | Biswas | |
| 2013/0231779 A1 | 9/2013 | Purkayastha et al. | |

FOREIGN PATENT DOCUMENTS

| | | |
|---|---|---|
| JP | 2008234041 A | 10/2008 |
| JP | 2008269232 A | 11/2008 |
| JP | 2009225437 A | 10/2009 |
| JP | 201193186 A | 5/2011 |
| WO | WO2011014852 A2 | 2/2011 |

OTHER PUBLICATIONS

Heikkila, "Secure Digital Pseudonyms for Privacy and Liability," May 28, 2002, Master's Thesis, Helsinki University of Technology, pp. 1-69.

Adachi et al., "Guide Robot's Navigation Based on Attention Estimation Using Gaze Information," Proceedings of 2004 IEEE/RSJ International Conference on Intelligent Robots and Systems, Sep. 28-Oct. 2, 2004, IEEE, pp. 540-545.

Toshihide Nakatsu et al., "The context generation system based on user logs," IPSJ SIG Technical Report DVD-ROM, Information Processing Society of Japan, Apr. 2011, p. 1-7.

* cited by examiner

| TIME INTERVAL | ENCRYPTED CONTEXT |
|---|---|
| t1-t2 | 49586760 |
| t1-t2 | 79595745 |
| t1-t2 | 10494857 |

1404 DISK DRIVE 150

| TIME INTERVAL | ENCRYPTED CONTEXT |
|---|---|
| t1-t2 | 49586760 |
| t1-t2 | 79595745 |
| t1-t2 | 10494857 |

1406 COMPUTER 130

ROBOT 110

310 REAL NAME-IDENTIFICATION NAME CORRESPONDENCE TABLE

| REAL NAME | IDENTIFICATION NAME | CONTEXT KEY |
|---|---|---|
| Alice | X123 | $K_{Alice}$ |
| Bob | 47D3 | $K_{Bob}$ |

320 IDENTIFICATION NAME-TIME INTERVAL CORRESPONDENCE TABLE

| IDENTIFICATION NAME | TIME INTERVAL |
|---|---|
| X123 | t1-t2 |
| 47D3 | t1-t2 |

| TIME INTERVAL | PRIMARY CONTEXT | ENCRYPTED CONTEXT |
|---|---|---|
| t1-t2 | { Vs, 80%, X123 } | 49586760 |
| t1-t2 | { Vs, 80%, 47D3 } | 79595745 |
| t1-t2 | { Vs, 60%, X123 } | 10494857 |

PROCESSING CONTEXT INFORMATION

CROSS-REFERENCE TO RELATED APPLICATION

This application claims priority under 35 U.S.C. §119 from Japanese Patent Application No. 2011-138026 filed Jun. 22, 2011, the entire contents of which are incorporated herein by reference.

BACKGROUND OF THE INVENTION

1. Field of the Invention

The present invention relates to a security framework technique. More particularly, the present invention relates to processing context information in an environment requiring privacy and security protection.

2. Description of Related Art

Recently, we have begun introducing robots into homes to operate home electric appliances, aid in child rearing, support the elderly, care for pets, perform surveillance, provide entertainment, etc. Such robots for individuals or home use can be called personal robots. These robots are also being introduced for administration in the office, information retrieval support, other office work support, etc.

Basically, these robots include: (1) various sensors, such as an image sensor, a sound sensor, and a contact sensor; (2) a manipulator for walking, holding, and the like; (3) a speech synthesis engine; and (4) an engine for performing character recognition, image recognition, or speech recognition based on the results of the various sensors. For example, the image recognition engine includes an individual identification function using facial recognition.

It is preferred that the robot should also have the function of communicating with a personal computer or a server through radio communication.

If the robot sends data acquired from the various sensors to the personal computer or the server, the storage of the personal computer or the server will be filled up immediately because of massive amounts of data. Therefore, the robot performs preprocessing such as character recognition, image recognition, or speech recognition on data detected by the sensors, converts the data to contracted context information indicating who was in what state, and sends it to the personal computer or the server. Then, the robot deletes the data acquired from the sensors after sending the context information. Processing for contracting the data detected by the sensors into a context cannot be performed by the components in the robot alone. As such, the data detected by the sensors can be first sent to the personal computer or the server to perform processing for contracting data into a context so that contracted context data will be stored on the personal computer or the server. Even in this case, the data acquired from the sensors can be deleted in the same manner after the completion of the contraction processing.

However, if the contracted context information continues to be recorded over a long period of time like a life log, the information will become too massive to fit in the personal computer or the server. Therefore, the context information is sent to low bit-cost storage devices, such as cloud servers or network connection disks, to continue the recordation.

However, since cloud servers or network connection disks are not always secure, the robot encrypts the context information with a specific key and sends the encrypted text information to these storage devices so that the context information will be recorded therein.

The image sensor of the robot can possibly capture at least two persons simultaneously. In such cases, it is difficult to dispose context information if one desires to delete context information related to a specific person for privacy protection or confidentiality.

Japanese Patent Application Publication No. 2008-269232 discloses an information processor equipped with a hard disk drive internally storing a cipher key that encrypts data and records the data on a disk, where upon receipt of an urgent message from a security server, a BIOS notifies the hard disk drive of a cipher key delete command. Upon receipt of the cipher key delete command, the hard disk drive deletes the cipher key.

Japanese Patent Application Publication No. 2009-225437 discloses a technique in which a data storage device uses a cipher key to encrypt incoming data automatically without any command and/or control by a host system or any other component outside the device and the host system's or any other component's dedicated control. An encryption function is a built-in function or a self-contained function of the drive and/or the dedicated controller. To permanently delete the entire content of the drive, the cipher key is located and erased to render the stored cipher text unusable. The disposable data is managed on a file basis through multiple internally-generated file-specific cipher keys that are managed with the aid of an internal key library.

EVANS, et al. "Context-Derived Pseudonyms for Protection of Privacy in Transport Middleware and Applications," PERCOMW '07 Proceedings of the Fifth IEEE International Conference on Pervasive Computing and Communications Workshops, IEEE Computer Society Washington, D.C., USA, pp. 1-6, 2007 (hereinafter "Evans") discloses a technique related to secure sharing of a private context between two users who agreed to share the context. In the technique, the context is made secret by using message authentication code and is stored in an open repository.

Japanese Patent Application Publication No. 2008-269232 and Japanese Patent Application Publication No. 2009-225437 disclose that a cipher key is deleted in a specific situation. Further, Evans discloses that a context is made secret and is written onto a disk or the like.

However, even if these conventional techniques are combined, nothing mentions a technique that invalidates context information of a specific user in an environment containing the context information.

SUMMARY OF THE INVENTION

Therefore, it is an object of this invention to provide a technique that invalidates context information only of a specific target from among pieces of context information encrypted and recorded by a robot or the like.

Accordingly, one aspect of the present invention provides a system for generating contexts of targets to estimate a high-order context from a plurality of contexts, the system including: a detection device including: a sensor for detecting a target; a module for extracting the target and a primary context of the target based on data detected by the sensor; and a module for encrypting the primary context with a key corresponding to the target; a storage device for recording encrypted primary context from the detection device; and a processing device including: a module for receiving the encrypted primary context from the storage device; a module for receiving the key corresponding to the target involved in the encrypted primary context; a module for decrypting the encrypted primary context using the received key; and a module for estimating a high-order context using the decrypted primary context; where the processing device further includes a module for requesting the detection device to delete information on a key corresponding to a specific target.

Another aspect of the present invention provides a method of generating contexts of targets to estimate a high-order context from a plurality of contexts, the method including the steps of: recording, by using a detection device, an encrypted primary context in a storage device, where the detection device includes: a sensor for detecting a target; a module for extracting the target and a primary context of the target based on data detected by the sensor; and a module for encrypting the primary context with a key corresponding to the target; receiving the encrypted primary context from the storage device; receiving the key corresponding to the target involved in the encrypted primary context; decrypting the encrypted primary context using the received key; and requesting the detection device to delete information of a key corresponding to a specific target; where at least one of the steps is carried out using a computer device.

BRIEF DESCRIPTION OF THE DRAWINGS

FIG. 14 is a diagram showing an example of data in the three-layer model composed of the robot, the computer, and the disk drive in the context generation processing according to an embodiment of the present invention.

DETAILED DESCRIPTION OF THE PREFERRED EMBODIMENTS

Figure 1:
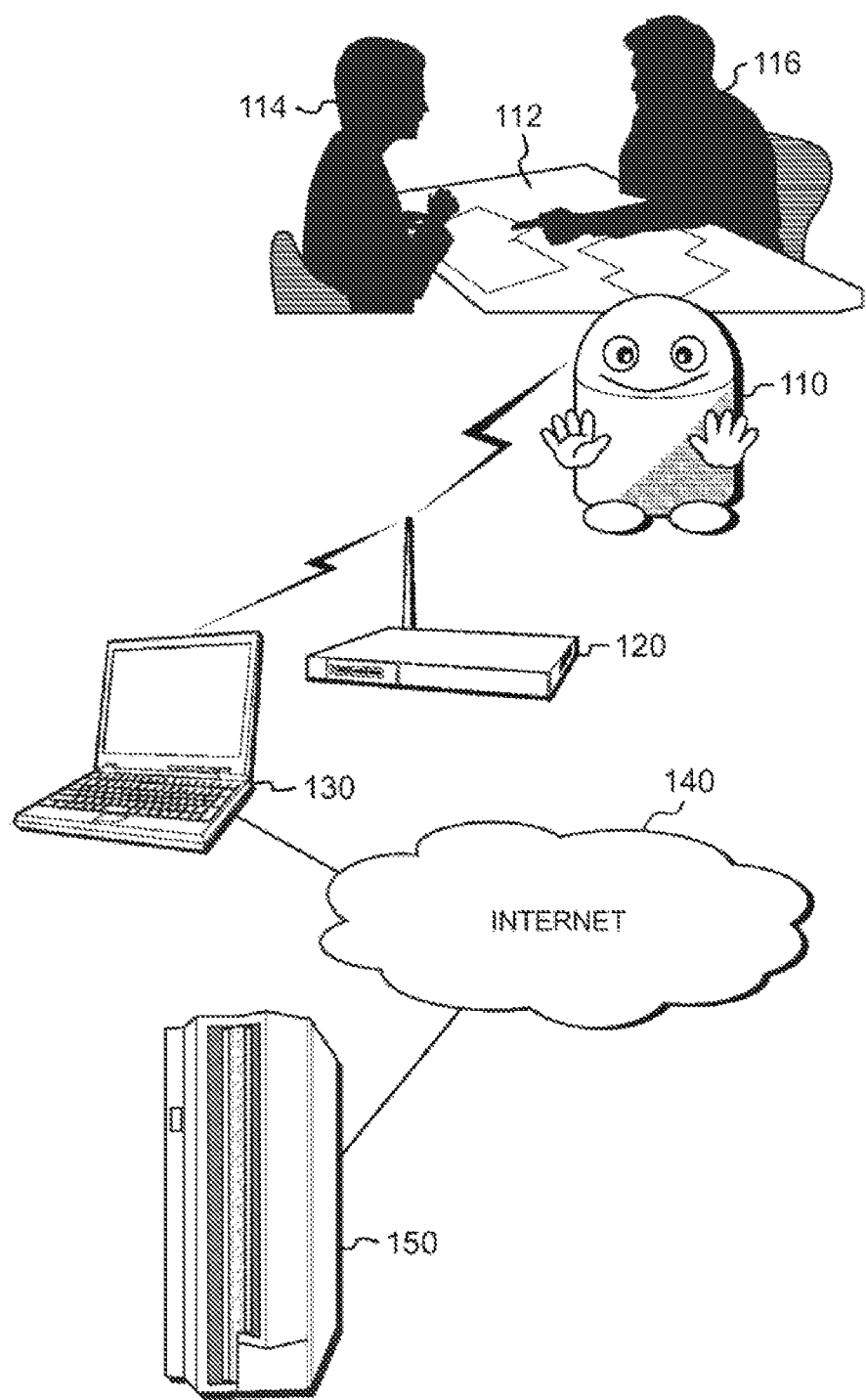
FIG. 1 is a schematic diagram showing a system composed of a robot, a computer, and a disk drive according to an embodiment of the present invention.

A preferred embodiment of the present invention will now be described with reference to the accompanying drawings. Throughout the drawings, the same reference numerals denote the same targets unless otherwise noted. It should be noted that the following description is one preferred embodiment and this invention is not limited to the content described in this embodiment.

When context information is extracted from data (hereinafter called sensor data) that is recognized by a sensor, an embodiment of the present invention first recognizes a subject or target of the context, generates a corresponding key for the target, and encrypts the context information. Therefore, when a delete request to delete a context associated with a specific recognition target is made, only the key is deleted to disable: (1) contexts stored in distributed multiple databases; or (2) storages from being decrypted.

As for a context containing multiple recognition targets, another embodiment of the present invention converts these recognition targets into a bit table, duplicates the context as many times as the number of recognition targets, and encrypts the context using a key for each individual recognition target, respectively. Thus, after the delete request to delete the content associated with the specific recognition target is processed, the system can prevent information on the recognition target from being left intact. Further, in this technique, the size of an encrypted content is small, so decryption becomes easier.

Further, when a sensor recognizes data and extracts context information from such data, another embodiment of the present invention uses a correspondence table among a real name, an identification name, and a cipher key to replace the target name with the identification name in order to make the target name anonymous.

In one aspect of the present invention, a real name-identification name correspondence table, in which a cipher key is assigned to each individual real name for every time slot, is created, and a context is encrypted using the same so that a content related to a specific recognition target can be deleted in every time range.

Further, a correspondence table for associating a time slot with an identification name recognized in the time slot can be used to make the decryption of a context efficient.

According to this invention, a correspondence table with a cipher key specified for each identified target is prepared to decrypt an encrypted context based on the entries of this correspondence table. Therefore, only an entry specified in the correspondence table can be deleted to disable contexts related to a specific target from being decrypted, and one can achieve confidentiality and privacy protection.

FIG. 1 is a schematic diagram showing components for carrying out an embodiment of the present invention. In FIG. 1, a robot 110 has an intelligent function for identifying specific persons and other target objects through image recognition, speech recognition, or the like. In the example of FIG. 1, based on preregistered personal facial information, speech information, or the like, the robot 110 identifies persons 114 and 116 across a table 112.

For example, the robot 110 is equipped with a communication device having a wireless local area network (LAN) communication function such as IEEE 802.11g to send primary context information including personal identification information to a personal computer 130 through a wireless LAN station 120.

Based on the primary context information received, the personal computer 130 generates secondary context information indicating which person shares space with which person or the like, and records it in a hard disk drive. Although a hard disk drive with a large capacity of about 500 GB has been commonly equipped in the personal computer 130 in recent years, since the personal computer 130 continues to record, in the hard disk drive, information continuously sent from the robot 110, the hard disk drive will be filled up if the personal computer keeps on recording.

Therefore, the personal computer 130 uses, for example, a cloud computing storage service accessed through the Internet 140 to write the secondary context information recorded in the hard disk drive into a storage area (disk drive) 150 offered by the storage service periodically and delete the secondary context information from the hard disk drive.

The storage area 150 offered by the storage service has a large capacity with a low cost. However, if the secondary context information is written intact into the storage area 150 offered by the storage service, since its security protection mechanism such as access control is not sufficient, it will not be difficult for a third person to get the secondary context information, causing privacy or security problems.

Therefore, the robot 110 generates a cipher key unique to the recognized person and sends it to the personal computer 130. Upon writing secondary context information into the storage area 150 offered by the storage service, the personal computer 130 encrypts the secondary context information with the personal cipher key associated with the secondary context information, and writes it into the storage area 150. This will disable the third person from knowing the content even if he/she gets the secondary context information.

The storage area 150 can consist of two or more disk drives. The service can be networked network-attached storage (NAS) or storage area network (SAN) other than the cloud computing storage service, or the storage area 150 can be local disks connected through universal serial bus (USB). Thus, when the storage area 150 consists of two or more disk drives, a specific disk drive among them is set as a default disk drive, which is given priority over the other disk drives.

Figure 2:
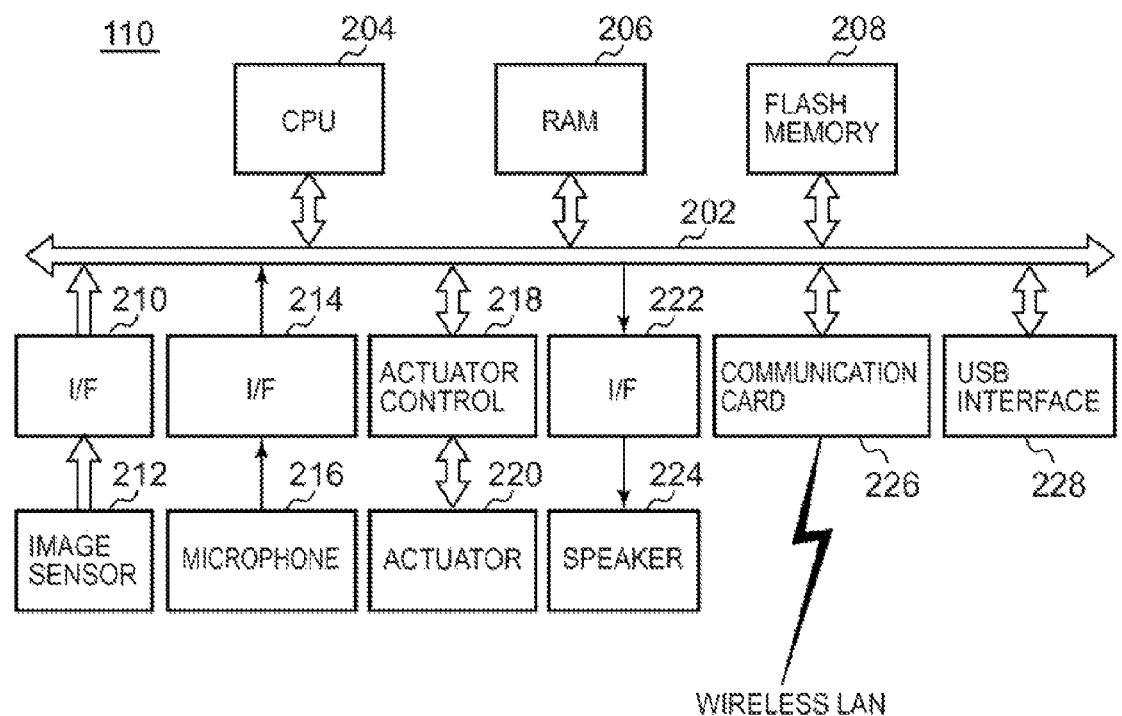
FIG. 2 is a block diagram showing internal hardware of the robot according to an embodiment of the present invention.

Referring next to a block diagram of FIG. 2, the hardware structure of the robot 110 will be described. After all, the robot 110 is a built-in computer system having a bus 202. A CPU 204, a main storage (RAM) 206, and a flash memory 208 as a nonvolatile storage device are connected to the bus 202. An embedded operating system like Linux®, and robot control programs such as image recognition, speech recognition, and actuator controller, are stored in the flash memory 208. The CPU 204 can be a microprocessor with a 64-bit or 32-bit CISC or RISC architecture used for personal computers. Further, a hard disk drive can also be equipped as the nonvolatile storage device instead of the flash memory or as an additional memory.

An image sensor 212 is also connected to the bus 202 through a predetermined interface 210. The image sensor 212 is preferably equipped with a charge-coupled device (CCD), but it can use a cheaper complementary metal-oxide-semiconductor (CMOS) sensor. The image sensor 212 is used to perform image recognition on persons and target objects to identify them.

Further, a microphone 216 is connected to the bus 202 through a predetermined interface 214 such as an A/D converter. The microphone 216 is used to perform speech recognition to identify the spoken voice of a person.

Further, an actuator 220 for walking wheels or the like is connected to the bus 202 through an actuator control section 218. The actuator 220 includes an electric drive source such as a rotary motor or a stepping motor to perform control through a servo-control mechanism. If the robot 110 is a robot walking on two legs, the actuator control section 218 is required to perform complicated control. However, since this is not the main theme of this invention, a detailed description thereof will be omitted.

Further, a speaker 224 is connected to the bus 202 through a predetermined interface 222 such as a D/A converter. The speaker 224 is used to output voice synthesized by a voice synthesis module.

Further, a communication card 226 is connected to the bus 202 to communicate with an IEEE802.11g wireless LAN station or the like.

Further, a USB interface 228 is connected to the bus 202. For example, the USB interface 228 is connected to the personal computer 130 through a USB cable, and used to enter a command, a character string, or the like through the personal computer 130, set it in the robot 110, and store information.

Though not shown, the robot 110 is equipped with a rechargeable battery, such as a lithium-ion battery, a nickel-cadmium battery, or a nickel hydride battery, as the source of electric energy. The rechargeable battery is, for example, charged by an AC adapter (not shown) connected to a power plug through the USB interface 228.

Though not shown, the robot 110 can also be equipped with a proximity sensor such as an infrared sensor, a displacement sensor such as a potentiometer, an inclination sensor, a pressure sensor, an acceleration sensor, a GPS, and the like, depending on the intended use.

Figure 3:
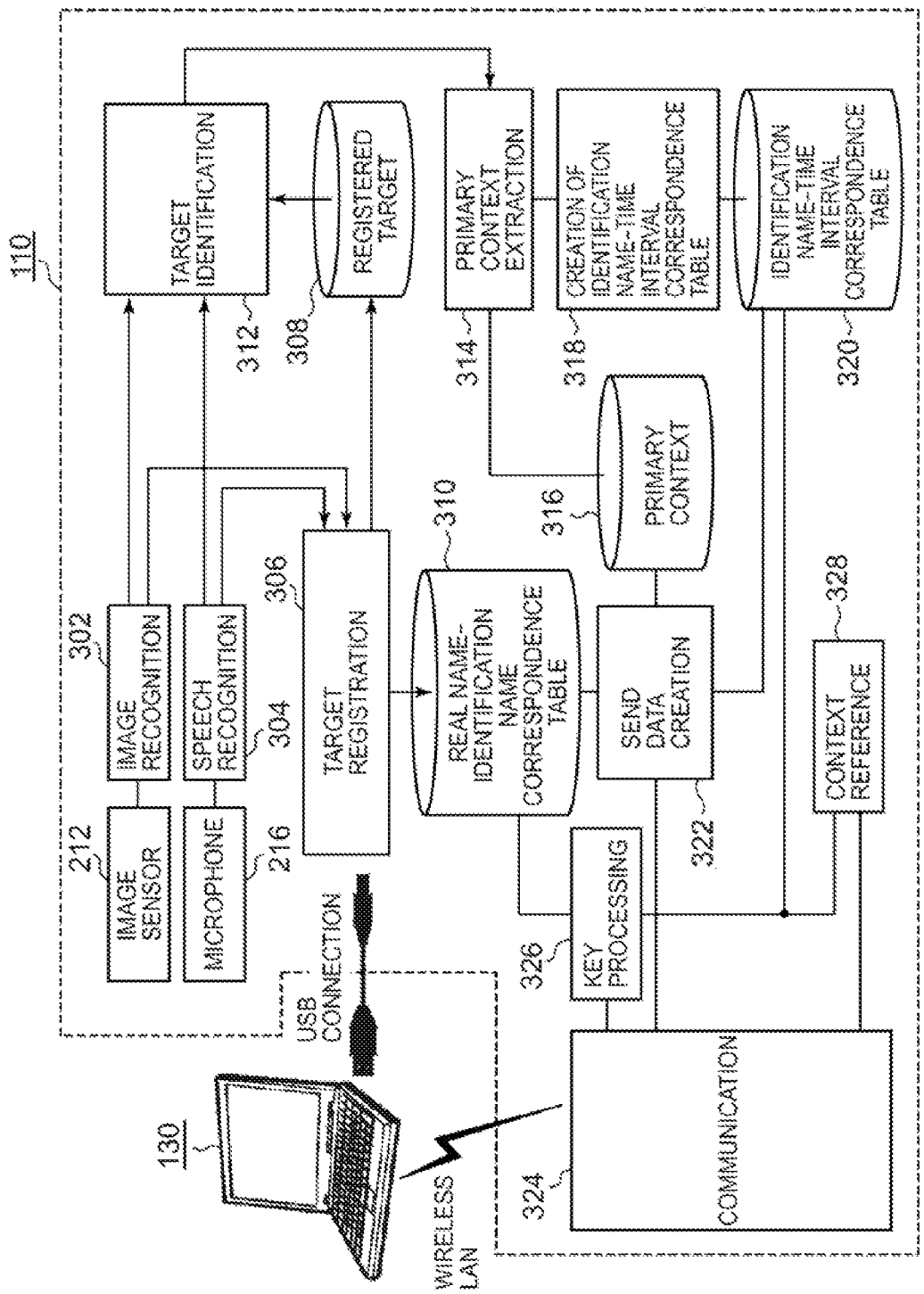
FIG. 3 is a block diagram showing a functional configuration of the robot according to an embodiment of the present invention.

FIG. 3 is a block diagram showing a functional configuration of the robot 110. An image-recognition module 302 is stored in the flash memory 208, and loaded into the main storage 206 and executed as required. An image-recognition module 302 has the function of performing processing on an image captured from the image sensor 212, such as threshold processing, edge processing, noise elimination, color extraction, and labeling, to extract the features of the target image.

A speech-recognition module 304 is stored in the flash memory 208, and loaded into the main storage 206 and executed as required. The speech-recognition module 304 has the functions of capturing an analog speech signal from the microphone 216, and performing processing, such as A/D conversion, discrete Fourier transform, and meta-filter discrete cosine transform, to recognize and extract the content of a conversation.

A target registration module 306 is stored in the flash memory 208, and loaded into the main storage 206 and executed as required. The target registration module 306 is used on the condition that the personal computer 130 is connected to the robot 110 through a USB cable. In other words, while the image sensor 212 of the robot 110 is capturing a target such as a person, or while the voice of the person as the target is being captured through the microphone 216, the target registration module 306 runs either or both of the image-recognition module 302 and the speech-recognition module 304, and stores the recognition results in the flash memory 208 as a registered target 308. In this regard, the target registration module 306 prompts the user on the screen of the personal computer 130 to enter a real name of the recognized target. In response to this, when the user of the personal computer 130 enters the real name, the target registration module 306 generates a unique identification name corresponding to the real name and a context key, creates a real name-identification name correspondence table 310, and stores it preferably in the flash memory 208. Upon completion of the target registration by the target registration module 306, it is preferred that the USB cable between the robot 110 and the personal computer 130 be disconnected. Since the robot 110 and the personal computer 130 are connected through a wireless LAN, the target registration can be made via the wireless LAN, rather than the USB cable connection. Further, input of the real name can be voice input, rather than through a keyboard.

A target identification module 312 is stored in the flash memory 208, and loaded into the main storage 206 and executed as required. During the normal operation of the robot 110, the target identification module 312 compares feature data identified by the image-recognition module 302 or the speech-recognition module 304 with data on existing registered targets 308 to select a target having feature data, which is approximate to a certain extent, from among data on the registered targets 308.

A primary context extraction module 314 is stored in the flash memory 208, and loaded into the main storage 206 and executed as required. The primary context extraction module 314 has the functions of extracting only a primary context, indicating, for example, which target it is and where the target is, from the feature data itself identified by the image-recognition module 302 or the speech-recognition module 304, and writing it as a primary context 316. Once the primary context 316 is extracted, since the need to keep sensed data from the image sensor 212 or the microphone 216 is eliminated, it is preferred to delete the sensed data. Generally, since the capacity of a non-volatile storage device of the robot 110 is limited by its nature, large volumes of data cannot be kept continuously.

An identification name-time interval correspondence table creating module 318 creates an identification name-time interval correspondence table 320 including information on the time when the primary context extraction module 314 extracted the primary context, and an entry of the identification name corresponding to the target of the primary context, and stores the table 320 preferably in the flash memory 208. At this time, the correspondence between the real name and identification name of a target is acquired by looking it up it in the real name-identification name correspondence table 310.

A send data creation module 322 is stored in the flash memory 208, and loaded into the main storage 206 and executed as required. It is preferred that the send data creation module 322 should have a first mode, in which a context encrypted with a key is directly written from the robot 110 into the disk drive 150, and a second mode, in which information with the real name removed from the real name-identification name correspondence table 310, the primary context 316, and information on the identification name-time interval correspondence table 320 are once sent together from the robot 110 to the personal computer 130, and these pieces of information are once cached on the personal computer 130 and encrypted with key information on the personal computer 130 before being sent to the disk drive 150. In the first mode, if the wireless LAN station 120 also functions as a router, information on the encrypted context can be written from the wireless LAN station 120 directly to the disk drive 150.

A key processing module 326 is stored in the flash memory 208, and loaded into the main storage 206 and executed as required. Based on the time interval information received from the personal computer 130 through a communication module 324, the key processing module 326 acquires information on a corresponding context key from the identification name-time interval correspondence table 320 and the real name-identification name correspondence table 310, and sends it to the personal computer 130 through the communication module 324. The key processing module 326 further has the function of receiving a predetermined command from the personal computer 130 through the communication module 324 and deleting an entry including the key of a predetermined target from the real name-identification name correspondence table 310.

A context reference module 328 is stored in the flash memory 208, and loaded into the main storage 206 and executed as required. The context reference module 328 is triggered (by an event such as when the image sensor 212 or the microphone 216 detects a predetermined situation or the like) to send a context reference command to the personal computer 130 through the communication module 324 together with a key associated with the context. The key associated with the context is acquired by making a request to the key processing module 326. In response to this, when context information is sent from the personal computer 130, the context reference module 328 outputs a speech using the speaker 224 or drives the actuator 220 to work on the outside world.

When the robot 110 is turned off, data on the correspondence tables on the RAM 206 are encrypted with a predetermined key of the robot 110 and sent to the personal computer 130. The personal computer 130 writes the information into the hard disk drive. When the robot 110 is turned on again, the information is read from the personal computer 130, and decrypted with the predetermined key of the robot 110 so that the data on the correspondence table will be placed on the RAM 206 again.

Figure 4:
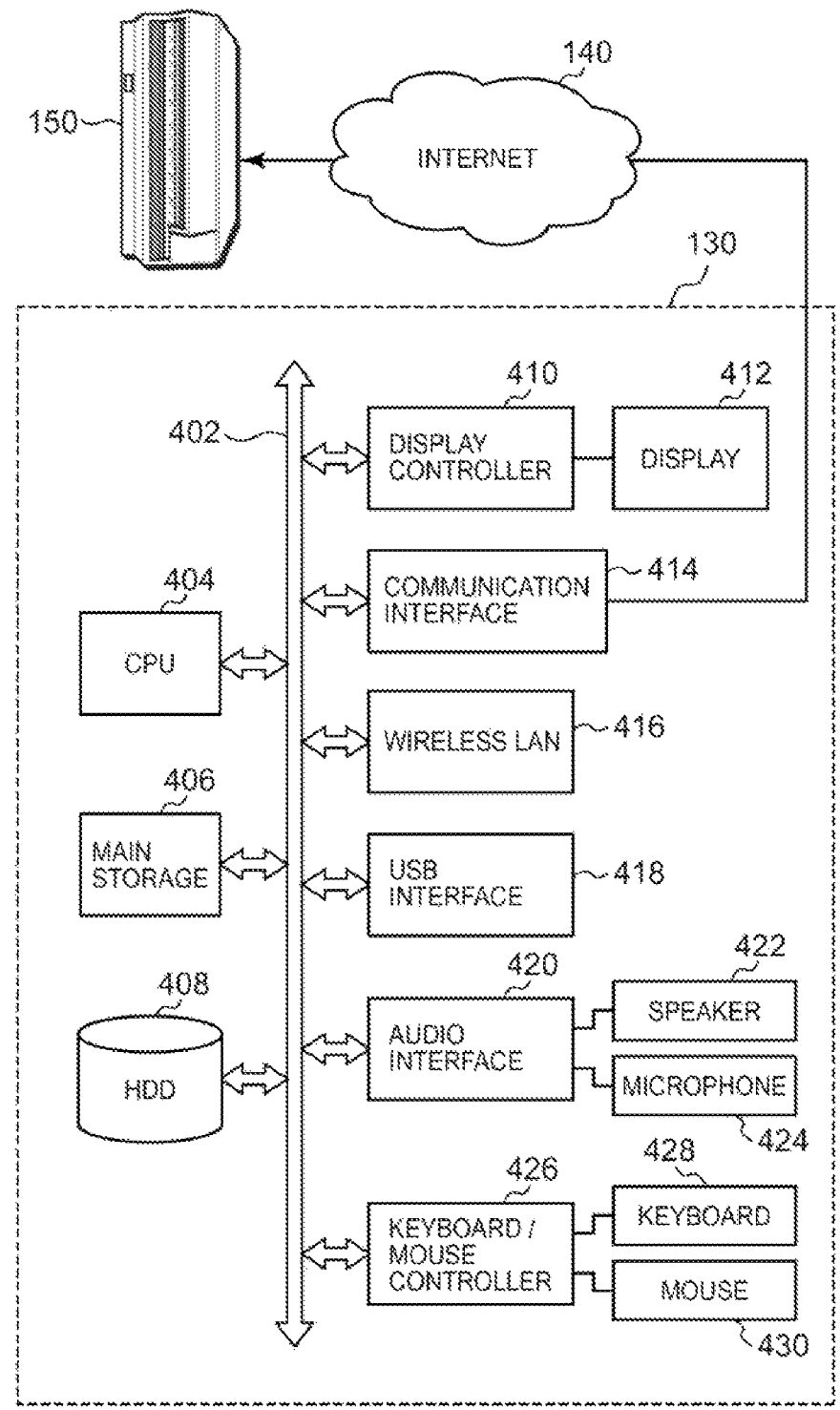
FIG. 4 is a block diagram showing internal hardware of the computer according to an embodiment of the present invention.

Referring next to FIG. 4, a configuration of the personal computer 130 will be described. In FIG. 4, the personal computer 130 has a CPU 404, a main storage 406, and a hard disk drive 408, and these components are connected to a bus 402. A display controller 410, a communication interface 414, a wireless LAN card 416, a USB interface 418, an audio interface 420, and a keyboard/mouse controller 426 are also connected to the bus 402. An LCD display 412 is preferably connected to the display controller 410.

The communication interface 414 is connected to the disk drive 150 of the cloud service through the Internet 140. If the wireless LAN station 120 also functions as a router, it can be connected to the disk drive 150 of the cloud service through the wireless LAN card 416 and the wireless LAN station 120 without using the communication interface 414.

The USB interface 418 is connected through a USB cable, and used to perform processing for registering a target with the robot 110.

A speaker 422 and a microphone 424 are connected to the audio interface 420.

A keyboard 428 and a mouse 430 are connected to the keyboard/mouse controller 426. The keyboard 428 is used to type the real name of a target and the like.

The CPU 404 can be of any type based, for example, on a 32-bit architecture or a 64-bit architecture, and Intel® Pentium® (the registered trademark of Intel Corporation) 4, Intel® Core™ 2 Duo Processor, AMD Athlon™, or the like can be used.

At least an operating system and a processing program for the present invention are stored in the hard disk drive 408. The operating system is loaded into the main storage 406 upon system start-up. Windows® XP (the registered trademark of Microsoft Corporation), Windows Vista™ (the registered trademark of Microsoft Corporation), Windows® (the registered trademark of Microsoft Corporation) 7, Linux® (the registered trademark of Linus Torvalds), or the like can be used as the operating system.

Further, a target registration module 502, an encrypted context sending module 504, a context reference module 506, a key acquisition module 510, a high-order context estimation module 512, and a context encryption module 514 are written in a programming language, such as C, C++, Java™, or the like, and stored in the hard disk drive 408 as a file in an executable format.

Figure 5:
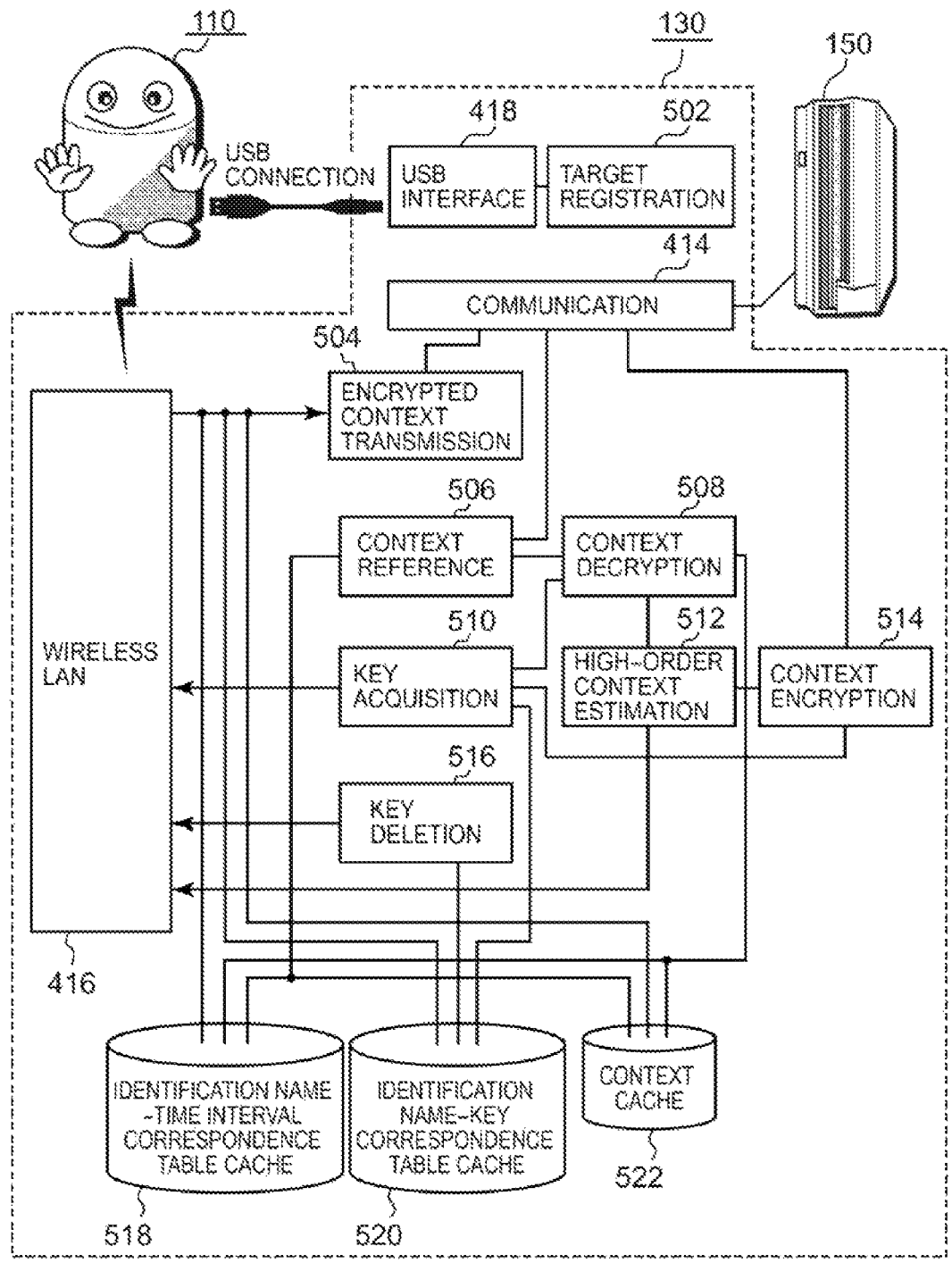
FIG. 5 is a block diagram showing a functional configuration of the computer according to an embodiment of the present invention.

Referring next to FIG. 5, a functional configuration of processing modules stored in the personal computer 130 and related to the present invention will be described. In FIG. 5, the target registration module 502 is connected to the robot 110 through the USB interface 418 to cooperate with the target registration module 306 of the robot 110 to perform target registration processing. The target registration module 502 accepts input of a real name from the keyboard 428 of the personal computer 130.

The encrypted context sending module 504 has the function of writing an encrypted context portion of data, sent from the robot 110 through the wireless LAN card 416, into the disk drive 150 through the communication module 414.

The context reference module 506 is stored in the hard disk drive 408, and loaded into the main storage 406 to run during execution. Based on information such as a time interval entered by the user of the personal computer 130, the context reference module 506 reads encrypted context information from the disk drive 150 through the communication module 414. Since the content of the encrypted context information cannot be read as it is, the information is turned over to the context decryption module 508.

The context decryption module 508 uses the key acquisition module 510 to get a key corresponding to an identification name, decrypt the encrypted context, and pass it to the high-order context estimation module 512.

When being requested to acquire a key from the context decryption module 508, the key acquisition module 510 first goes to an identification name-key correspondence table cache 520 to find a key, and when a key is found, the key is passed to the context decryption module 508. When no key is found in the identification name-key correspondence table cache 520, the key acquisition module 510 accesses the robot 110 through the wireless LAN card 416 to acquire a key. Specifically, in response to the request from the key acquisition module 510, the key processing module 326 of the robot 110 accesses the real name-identification name correspondence table 310 to get a key and send the key back to the key acquisition module 510.

The personal computer 130 has, as caches, an identification name-time interval correspondence table cache 518, the identification name-key correspondence table cache 520, and a context cache 522. It is preferred that, when the identification name-time interval correspondence table, the real name-identification name correspondence table, and a context are received from the robot 110, these caches should be placed on the main storage 406. In the context cache 522, the context decrypted by the context decryption module 508 is stored. The entries of the context cache 522 are composed of time interval, identification name, context, and cache expiration time.

The context information decrypted by the context decryption module 508 is used by the high-order context estimation module 512 to estimate a high-order context. The high-order context means information indicating two or more targets share space with each other for a certain period of time, or the like. The details of processing performed by the high-order context estimation module 512 will be described later.

The context encryption module 514 encrypts information on the high-order context, generated by the context decryption module 508, with a key corresponding to a target involved in the high-order context, and writes it into the disk drive 150. This disables a third person having no key from obtaining a meaningful content even if the third person reads the information on the high-order context from the disk drive 150.

The personal computer 130 can use the high-order context obtained by the estimation as an assistant at a conference or meeting, for the purpose of home protection, or the like.

Figure 6:
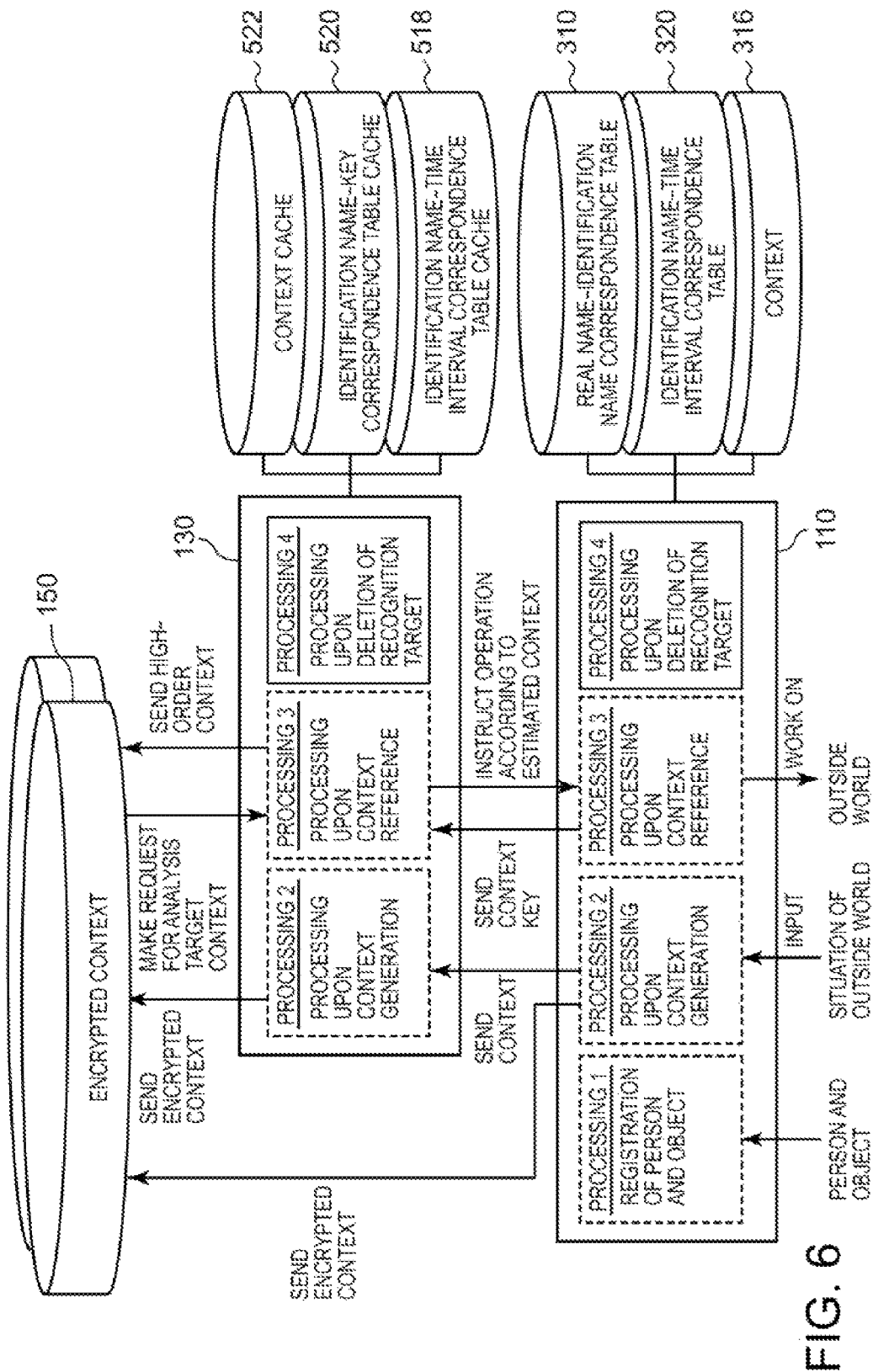
FIG. 6 is a diagram showing an outline of the operation of a three-layer model composed of the robot, the computer, and the disk drive according to an embodiment of the present invention.

FIG. 6 is a diagram schematically showing a three-layer structure of robot 110/computer 130/disk drive 150 and a flow of processing in the present invention.

As shown, in this three-layer structure, four types of processing are mainly involved. First, processing 1 is to register targets, namely persons and objects, performed by the robot 110. This processing causes the robot 110 to generate, preferably on the RAM 206 of the robot 110, the real name-identification name correspondence table 310 and the identification name-time interval correspondence table.

Next, processing 2 is processing upon context generation, and the robot 110 and the computer 130 are involved in the processing. In processing 2, the context generated by the robot 110 is encrypted with a corresponding key and written directly into the disk drive 150 in the first mode. Then, in the robot 110, the generated context is placed on the RAM 206 of the robot 110. Further, in the second mode, the context generated by the robot 110 is once sent to the computer 130 and stored in the main storage 406 as the context cache 522, and further, the context is encrypted with a corresponding key and written into the disk drive 150.

Processing 3 is context reference processing, and the robot 110, the computer 130, and the disk drive 150 are involved in the processing. It is preferred that the robot 110 should send a key, associated with a context desired to reference, to the computer 130 in response to a request from the computer 130 to start the context reference processing. In response to this, the computer 130 reads analysis target contexts from the disk drive 150. The computer 130 estimates a high-order context from the read contexts and returns the results to the robot 110. The robot 110 uses the results to work on the outside world. At the same time, computer 130 encrypts the generated high-order context with a corresponding key and writes the encrypted high-order context into the disk drive 150. Thus, when there is the same context reference processing, the computer 130 just has to acquire the high-order context information again from the disk drive 150 without the need to re-perform the high-order context estimation processing.

Processing 4 is processing upon deletion of a recognition target, and the robot 110 and the computer 130 are involved in the processing. In response to a request from the key deletion module 516 of the computer 130, the processing upon deletion of a recognition target is performed on a target corresponding to the requested target in the real name-identification name correspondence table 310 of the robot 110. At the same time, in the processing upon deletion of a recognition target, a key is also deleted from the identification name-key correspondence table cache 520 in the computer 130.

Referring next to flowcharts of FIG. 7 to FIG. 13, the contents of the above-mentioned processing 1 to 4 will be described.

Figure 7:
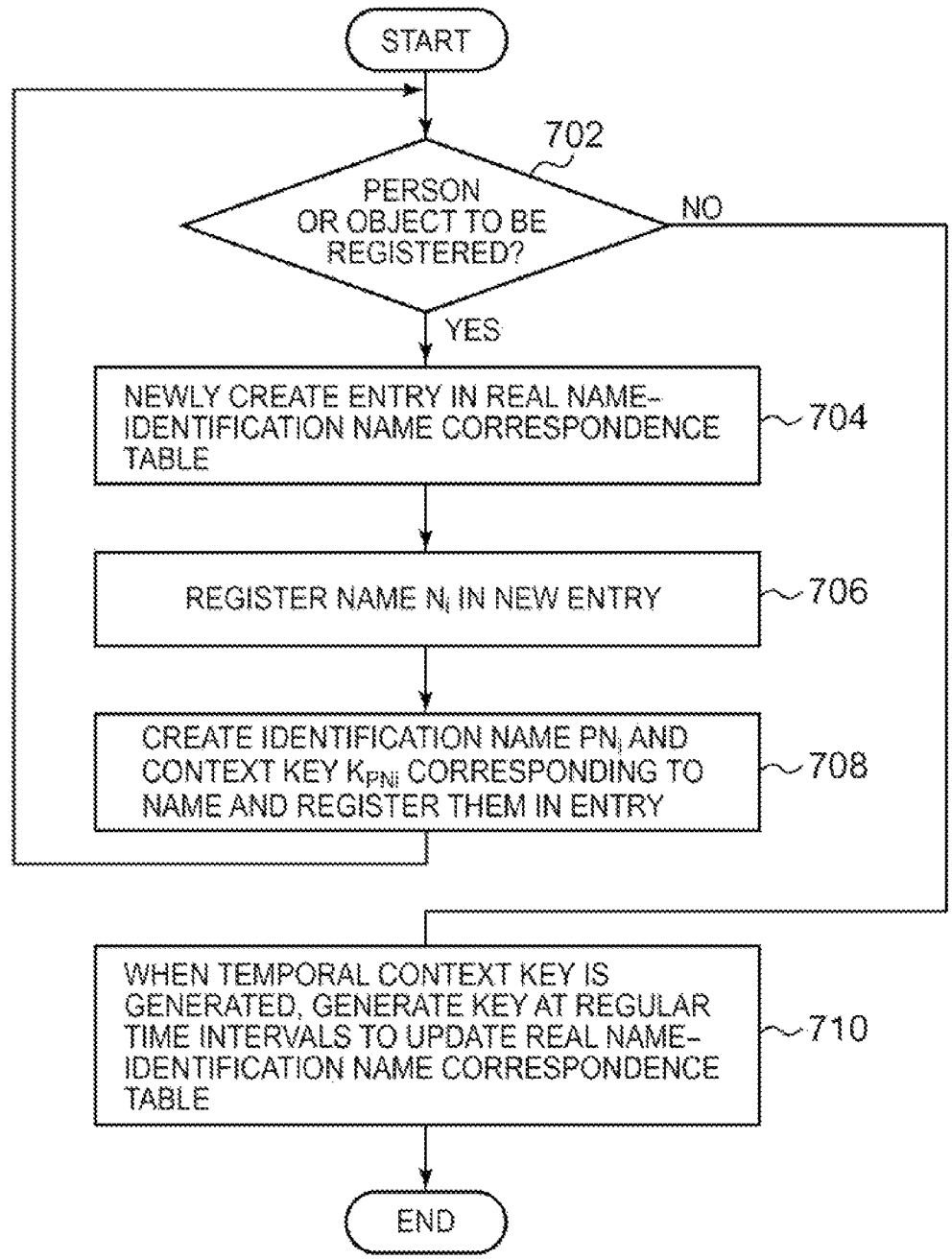
FIG. 7 is a flowchart of processing for target registration according to an embodiment of the present invention.

First, the flowchart of FIG. 7 is related to processing 1. For example, this processing is triggered by establishing a connection between the robot 110 and the computer 130 through a USB cable. Once triggered, the target registration module 306 of the robot 110 starts operating. Note that, as mentioned above, the robot 110 and the computer 130 can be connected via the wireless LAN, rather than the USB cable.

When it is determined in step 702 that a person or object is to be registered, the target registration module 306 prompts an operator in step 704 on the display 412 of the computer 130 to enter a real name in such a manner to cause the operator to enter a real name Ni on a menu displayed on the display 412 and presses an end-of-line key while reflecting an image of the person or object on the image sensor 212, or while collecting a person's voice through the microphone 216, to store the real name and data on feature components of the image, or the voice, in the flash memory 208. Then, in step 706, a new entry associated with the real name is registered.

In step 708, the target registration module 306 generates an identification name PNi and a cipher key KPNi in association with the real name Ni. An example of the content of the real name-identification name correspondence table 310 is shown in FIG. 14. As shown, the cipher key is also called a context key. The identification name PN1 is generated by the target registration module 306 through the generation of a random number or using any other algorithm to be unique. Though not limited thereto, it is assumed that an AES (Advanced Encryption Standard) method is used as the encryption method, and the key length is 128 bits. Such a key KPNi can be generated by using a random number or any other algorithm.

Returning to step 702, when there is another person or object to be registered, the operator is prompted in step 704 to enter a real name Ni on the menu displayed on the display 412 and press the end-of-line key while reflecting an image of another person or object to be registered, or while collecting a person's voice through the microphone 216, thus storing the real name and data on feature components of the image or the voice in the flash memory 208. Then, in step 706, a new entry is registered. In step 708, the target registration module 306 generates an identification name PNi and a cipher key KPNi in association with the real name Ni.

Thus, when all desired persons or objects are registered, the procedure proceeds to step 710. Step 710 is optional processing when a temporal context key is generated. In other words, when a temporal context key is generated, a key can be generated every regular interval to update the real name-identification name correspondence table 310.

Figure 8:
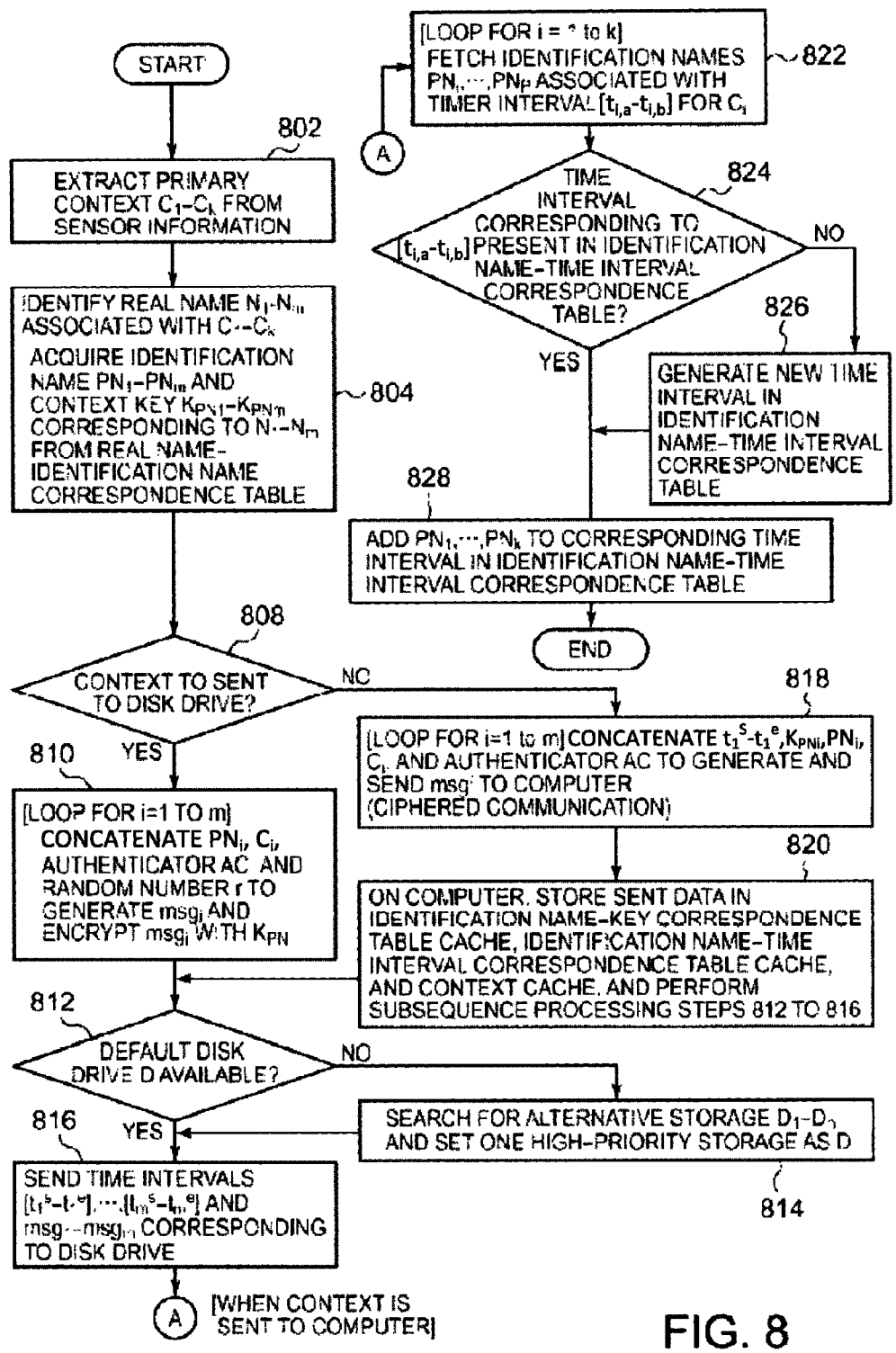
FIG. 8 is a flowchart of context generation processing according to an embodiment of the present invention.

Referring next to the flowchart of FIG. 8, processing 2 (processing upon context generation) will be described. In step 802 of FIG. 8, based on sensor information, i.e., the recognition results from the image sensor 212 or the microphone 216, and data on registered information 308 identified by the target identification module 312, the primary context extraction module 314 extracts a context C1-Ck. The context is basically to represent "a situation of a person or object for a certain period of time," and specifically composed of {Time Interval, Situation, person or object, Likelihood} as shown in data 1402 of FIG. 14 as a primary context, but this is just an illustrative example. For example, the likelihood can be optional. Note that the likelihood means the likelihood of estimation in the primary context estimation processing.

In step 804, the send data creation module 322 references the real name-identification name correspondence table 310 to identify a real name N1-Nk associated with the context C1-Ck.

Further, in step 804, the send data creation module 322 acquires an identification name PN1-PNm and a context key KPN1-KPNm corresponding to the real name N1-Nm from the real name-identification name correspondence table 310.

An example of data thus created is indicated by reference numeral 1402 in FIG. 14. Note that, in data 1402, Vs corresponds to a visual identification and Vc to an audio identification.

In step 808, the send data creation module 322 determines whether the context is to be sent to the disk drive 150 or to the computer 130. This determination can be made periodically. For example, the number of times can be so recorded that the times will be divided by a divisor to switch over between a mode of sending to the disk drive 150 and a mode of sending to the computer 130 according to the remainder value, such as to send the context to the disk drive 150 in the case of an odd number of times and send the context to the computer 130 in the case of an even number of times.

When the send data creation module 322 determines that the context should be sent to the disk drive 150, the procedure proceeds to step 810, in which PNi, Ci, authenticator AC, and random number r are concatenated in a range of i=1 to m to generate msgi in order to encrypt msgi with KPNi. The encryption method in this case is AES as mentioned above. The encryption method for such a message msg will be described later with reference to FIG. 11. In other words, in step 1102, a random number r is generated. Next, in step 1104, AC is set as a constant authenticator to generate Msg in Msg={PNi|Ci|AC|r}. Next, in step 1106, Msg itself is encrypted with E=EncK (Msg).

When msgi is generated, the send data creation module 322 determines in step 812 whether a default disk drive is available. When the default disk drive is not available, the disk drive is switched to an alternative disk drive in step 814 in order of priority, and in step 816, the send data creation module 322 sends corresponding time intervals [t1$s$-t1$e$], ..., [tms-tme] and msg1-msgm to an available disk drive in any case. For example, the data thus sent to the disk drive 150 is composed of time intervals and encrypted contexts as indicated by reference numeral 1404 in FIG. 14.

Figure 11:
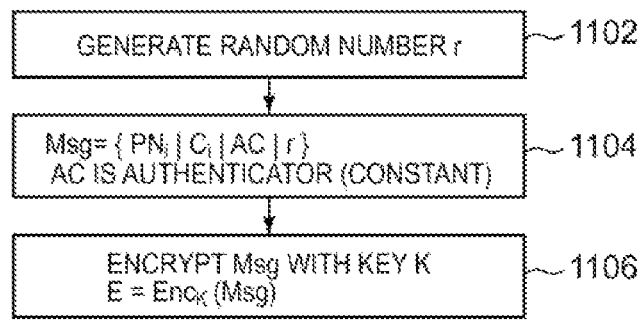
FIG. 11 is a flowchart showing processing of an encryption procedure according to an embodiment of the present invention.

On the other hand, when the send data creation module 322 determines that the context should be sent to the computer 130, the procedure branches from step 808 to step 818, in which PNi, Ci, authenticator AC, and random number r are concatenated in a range of i=1 to m to generate and send msgi to the computer 130 through ciphered communication as shown in FIG. 11.

Figure 12:
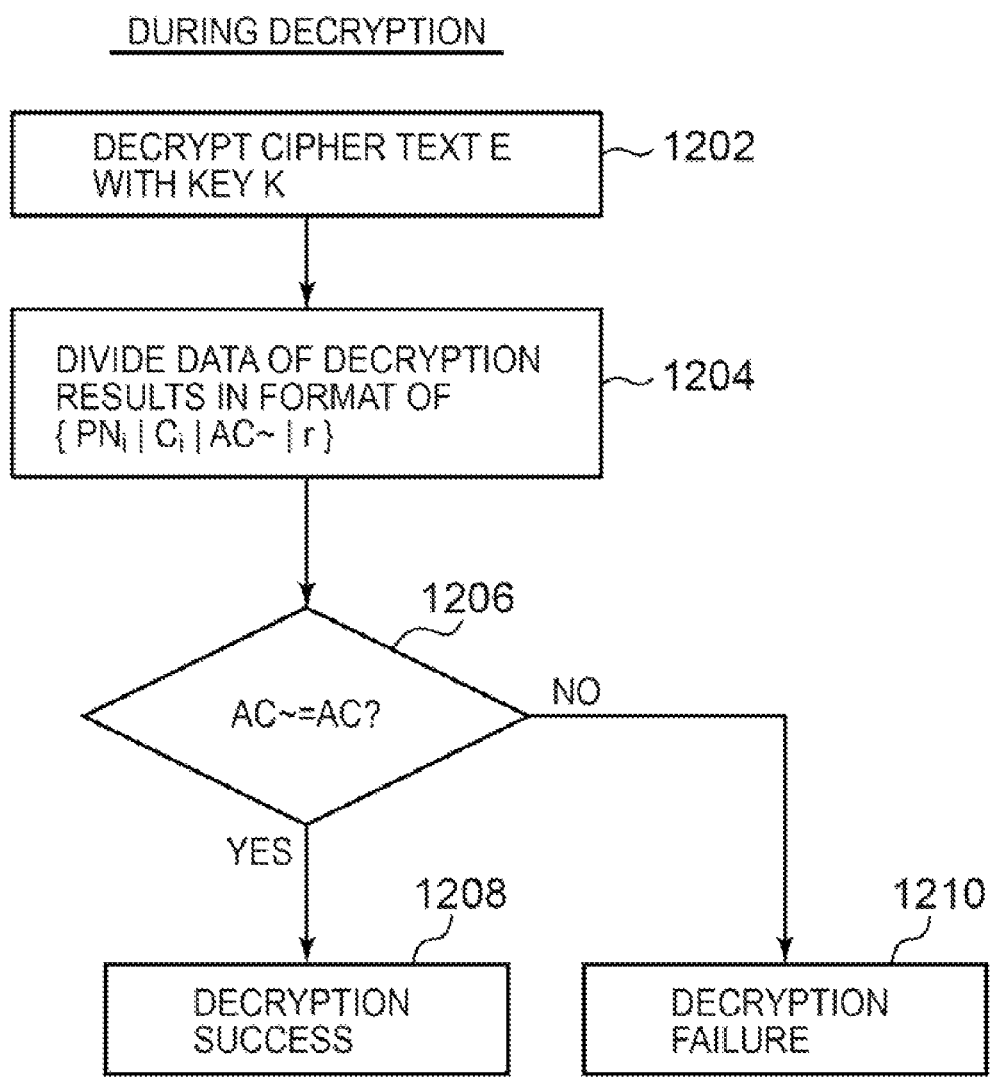
FIG. 12 is a flowchart showing processing of a decryption procedure according to an embodiment of the present invention.

In step 820, the computer 130 stores the send data in the identification name-key correspondence table cache 520, the identification name-time interval correspondence table cache 518, and the context cache 522, and the procedure proceeds to step 810. As shown in FIG. 12, the steps of accepting a message in the computer at this time are as follows: Cipher text E is decrypted with key K in step 1202, data of decrypted results is divided in a format of {PNi|Ci|AC~|r} in step 1204, it is determined in step 1206 whether AC~=AC, and if so, decryption success is determined in step 1208, or if not, decryption failure is determined in step 1210.

Data 1406 in FIG. 14 is prepared for transmission from the computer 130 to the disk drive 150, which is basically the same format as the data 1404.

In step 822, the identification name-time interval correspondence table creating module 318 fetches identification names PNi, ..., PNp associated with a time interval [ti,a-ti,b] for Ci in a range of i=1 to k.

In step 824, the identification name-time interval correspondence table creating module 318 determines whether a time interval corresponding to ti,a-ti,b is present in the identification name-time interval correspondence table, and if not, the time interval is created in step 826 in the identification name-time interval correspondence table 320, and in step 828, PN1, . . . , PNk are added to the corresponding time interval in the identification name-time interval correspondence table 320.

Figure 9:
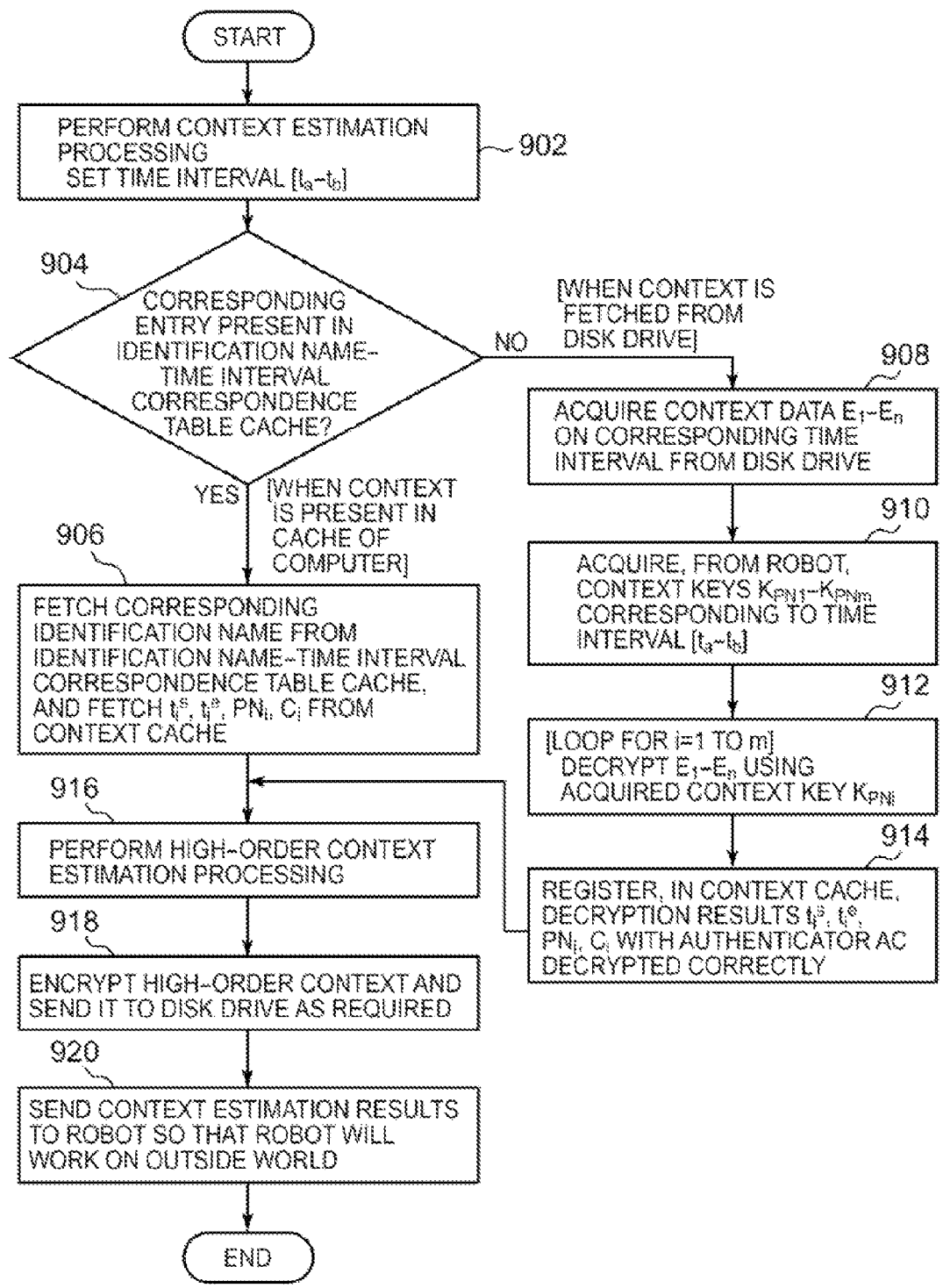
FIG. 9 is a flowchart of context reference processing and high-order context estimation processing according to an embodiment of the present invention.

Referring next to the flowcharts of FIG. 9 and FIG. 10, processing 3 (processing upon context reference) will be described. In FIG. 9, a time interval [ta-tb] for which context estimation processing is performed is set in step 902 for the context reference module 506. For example, this is done in such a manner that the user of the computer 130 types the time interval using the keyboard 428 or the like from a predetermined menu displayed on the display 412.

When the time interval[ta-tb] for which the context estimation processing is performed is set, the context reference module 506 determines in step 904 whether an entry corresponding to the time interval[ta-tb] is present in the identification name-time interval correspondence table cache 518.

If present, the context reference module 506 fetches in step 906 a corresponding identification name from the identification name-time interval correspondence table cache 518, and fetches a context tis, tie, PNi, Ci from the context cache 522.

On the other hand, when it is determined in step 904 that no entry corresponding to the time interval[ta-tb] is present in the identification name-time interval correspondence table cache 518, the context reference module 506 accesses the disk drive 150 to acquire a context E1-En of the corresponding time interval [ta-tb] in step 908.

In step 910, the key acquisition module 510 accesses the robot 110 via the wireless LAN to acquire a key corresponding to the time interval [ta-tb] from the real name-identification name correspondence table 310.

In step 912, the context decryption module 508 decrypts E1-En using the acquired context key KPNi in a range of i=1, . . . , m.

In step 914, the context decryption module 508 registers, in the context cache 522, tis, tie, PNi, and Ci as the decryption results in which the authenticator AC was decrypted correctly. For this decryption processing, see processing steps in FIG. 12. Particularly the details of step 914 will be described later with reference to the flowchart of FIG. 10.

The procedure proceeds from step 906 or step 914 to step 916, in which the high-order context estimation module 512 performs high-order context estimation processing. The details of the high-order context estimation processing will be described later.

In step 918, the context encryption module 514 encrypts an estimated high-order context and writes it to the disk drive 150.

In step 920, the high-order context estimation module 512 sends the estimated high-order context to the robot, and the robot works on the outside world accordingly based on the information while referencing the real name-identification name correspondence table 310 to replace an identification name included in the sent high-order context with a real name as required.

Figure 10:
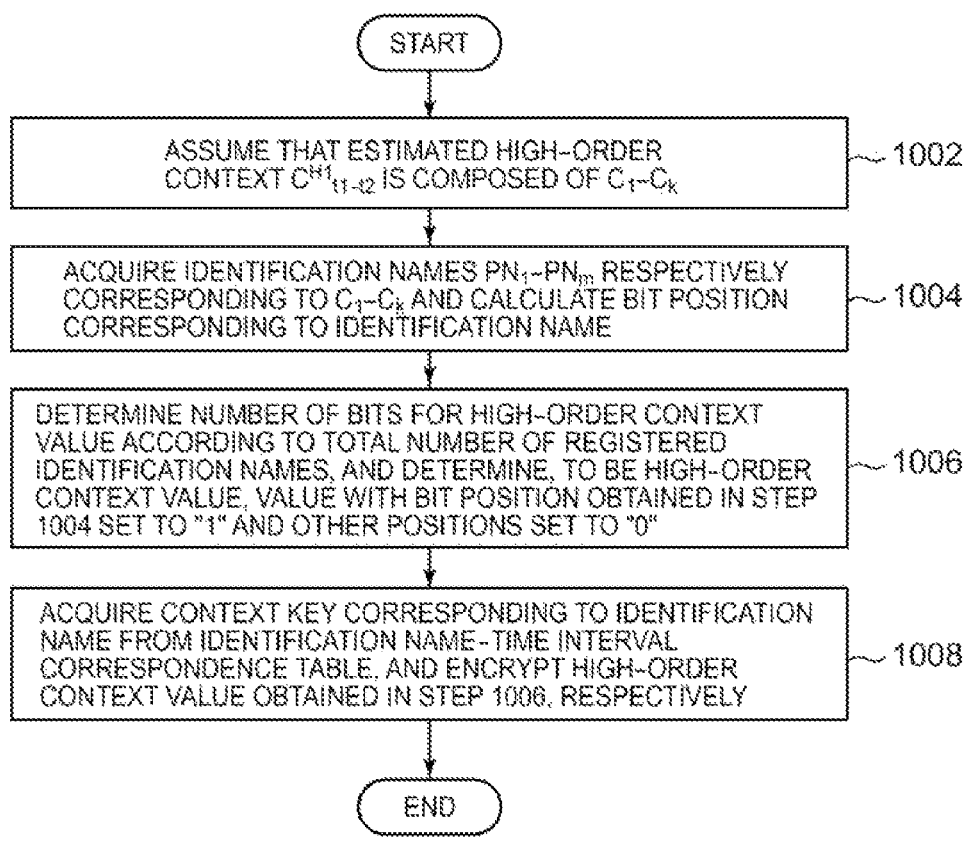
FIG. 10 is a flowchart of processing for configuring and encrypting data on an estimated high-order context according to an embodiment of the present invention.
Figure 15:
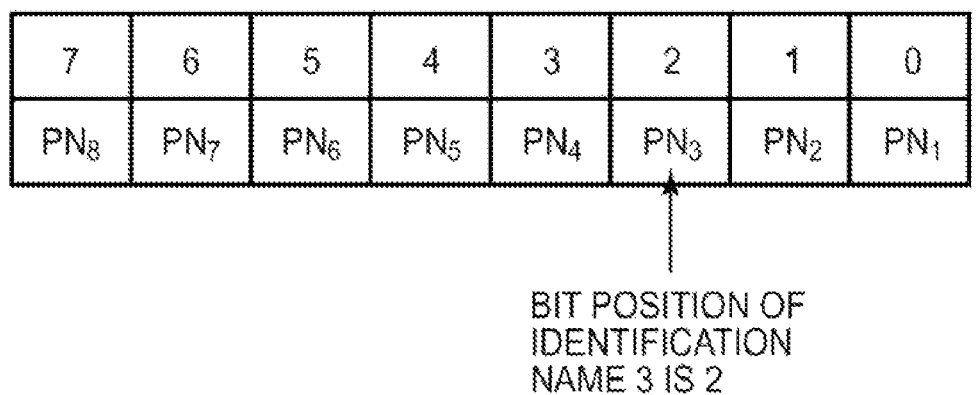
FIG. 15 is a diagram showing the structure of a bit table for a high-order context according to an embodiment of the present invention.

FIG. 10 is a flowchart for describing step 914 of FIG. 9 in more detail. In step 1002 of FIG. 10, it is assumed that the estimated high-order context CH1t1-t2 is composed of low-order contexts C1-Ck. Therefore, in step 1004, the high-order context estimation module 512 acquires identification names PN1-PNk respectively set for C1-Ck, and calculates a bit position corresponding to each identification name. Then, in step 1006, the number of bits for a high-order context value is determined according to the total number of registered identification names, and a value with the bit position obtained in step 1004 set to "1" and the other positions set to "0" is determined to be the high-order context value. FIG. 15 shows an example of the high-order context value.

In this example, when PN3 is included in a high-order context CH1t1-t2, the bit position of PN3 is 2 in CH1t1-t2.

Further, when PN3 and PN5 are included in the high-order context CH1t1-t2, the bit position of PN3 is 2 and the bit position of PN5 is 4.

The example of FIG. 15 is one byte to deal with identification names of eight persons. In the case of 16 persons, the value is two bytes. In general, in the case of N persons, N is divided by 8, and if it is divisible, the value will be N/8 bytes, or if it is indivisible, [N/8]+1 bytes is required. Note that [N/8] denotes the integral part of N/8.

Returning to the flowchart of FIG. 10, the context encryption module 514 acquires in step 1008 a context key corresponding to each identification name from the real name-identification name correspondence table 310 through the key acquisition module 510, and encrypts the high-order context value obtained in step 1006, respectively.

In the case of low-order contexts, encryption is performed as follows, i.e., the following low-order contexts are considered:

Presence, A, t1-t2
Presence, B, t1-t2
Presence, C, t1-t2

This indicates that targets A, B, C exist in the same place during a time interval t1-t2.

These are encrypted respectively as follows:
t1-t2, EKA (Presence, A)
t1-t2, EKB (Presence, B)
t1-t2, EKC (Presence, C)

KA, KB, KC are context keys of targets A, B, C, respectively, and EKA ( ) denotes encryption with a context key KA.

Therefore, the estimated high-order context is determined from the above low-order contexts to be Meeting{A,B,C}, t1-t2. According to the present invention, this is encrypted as follows:
t1-t2, EKA (Meeting{A,B,C})
t1-t2, EKB (Meeting{A,B,C})
t1-t2, EKC (Meeting{A,B,C})

This makes any of KA, KB, KC decryptable.

Suppose that A, B, C are identification names, e.g., that each of them is composed of 16 bytes. In this case, the more the number of persons, the more the number of bytes is required to represent the high-order context.

Therefore, according to the present invention, the high-order context is represented in a bit table as shown in FIG. 15 and encrypted as follows:
t1-t2, EKA (Meeting{1,1,1,0,0})
t1-t2, EKB (Meeting{1,1,1,0,0})
t1-t2, EKC (Meeting{1,1,1,0,0})

Figure 16:
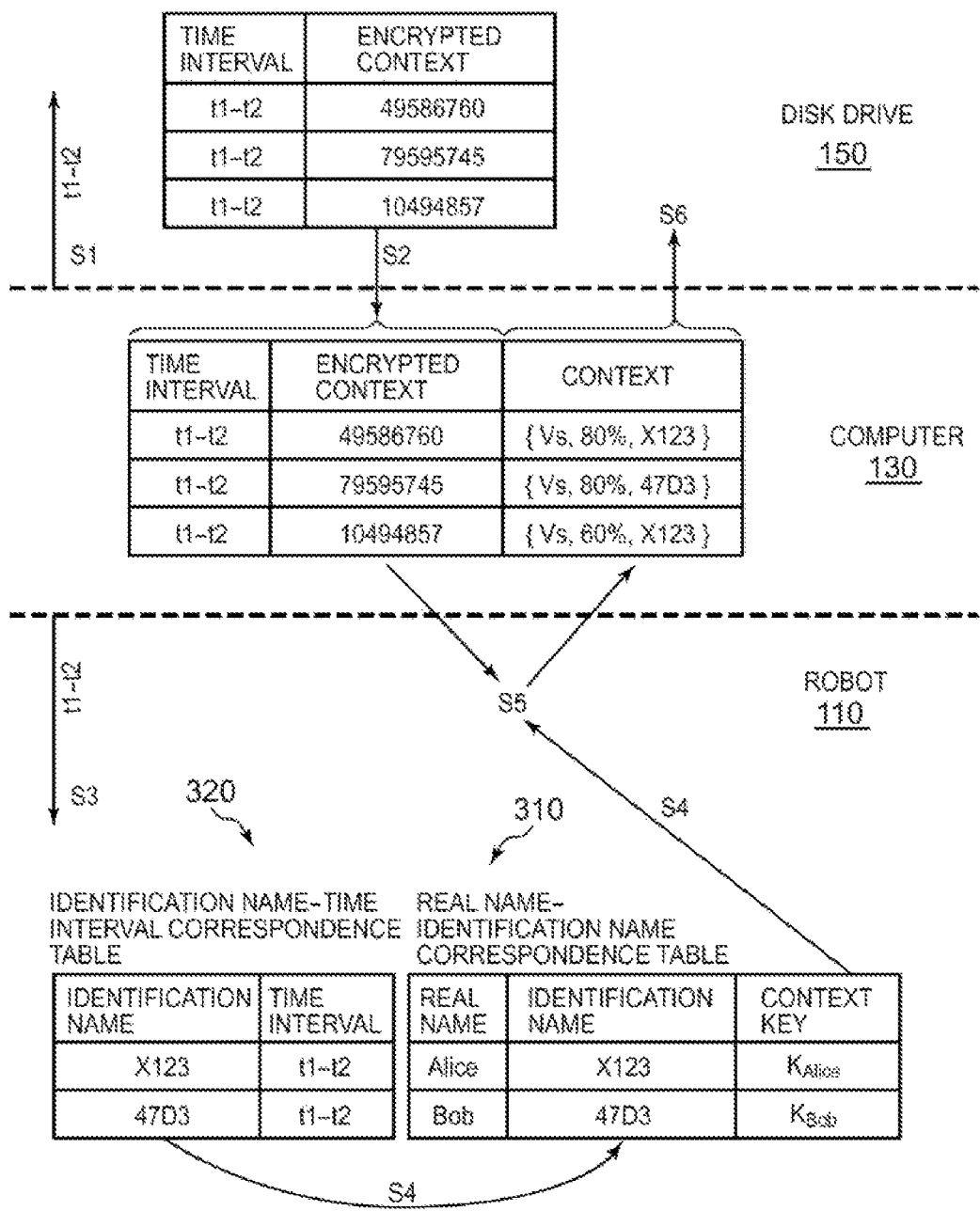
FIG. 16 is a diagram showing an example of data in the three-layer model composed of the robot, the computer, and the disk drive in the context reference processing and the high-order context estimation processing according to an embodiment of the present invention.

Referring next to FIG. 16, a specific example of processing 3 (processing upon context reference) is shown. In FIG. 16, the computer 130 sets in step S1 a time interval for which the context estimation processing is performed, and acquires in step S2 each encrypted context from the disk drive 150. These steps correspond to step 902 and step 908 in FIG. 9, respectively. In FIG. 16, each content contains a likelihood such as 80%, but this can be optional.

In step S3, the computer 130 requests, from the robot 110, a context key corresponding to the time interval for which the context estimation processing is performed.

In step S4, the robot 110 derives a corresponding identification name from the identification name-time interval correspondence table 320, and further a context key based on the identification name from the real name-identification name correspondence table 310, returning them to the computer 130.

In step S5, the computer 130 decrypts the encrypted context with the context key, verifies the authenticator, and restores the context.

In step S6, the computer 130 estimates a high-order context from the restored context.

Figure 13:
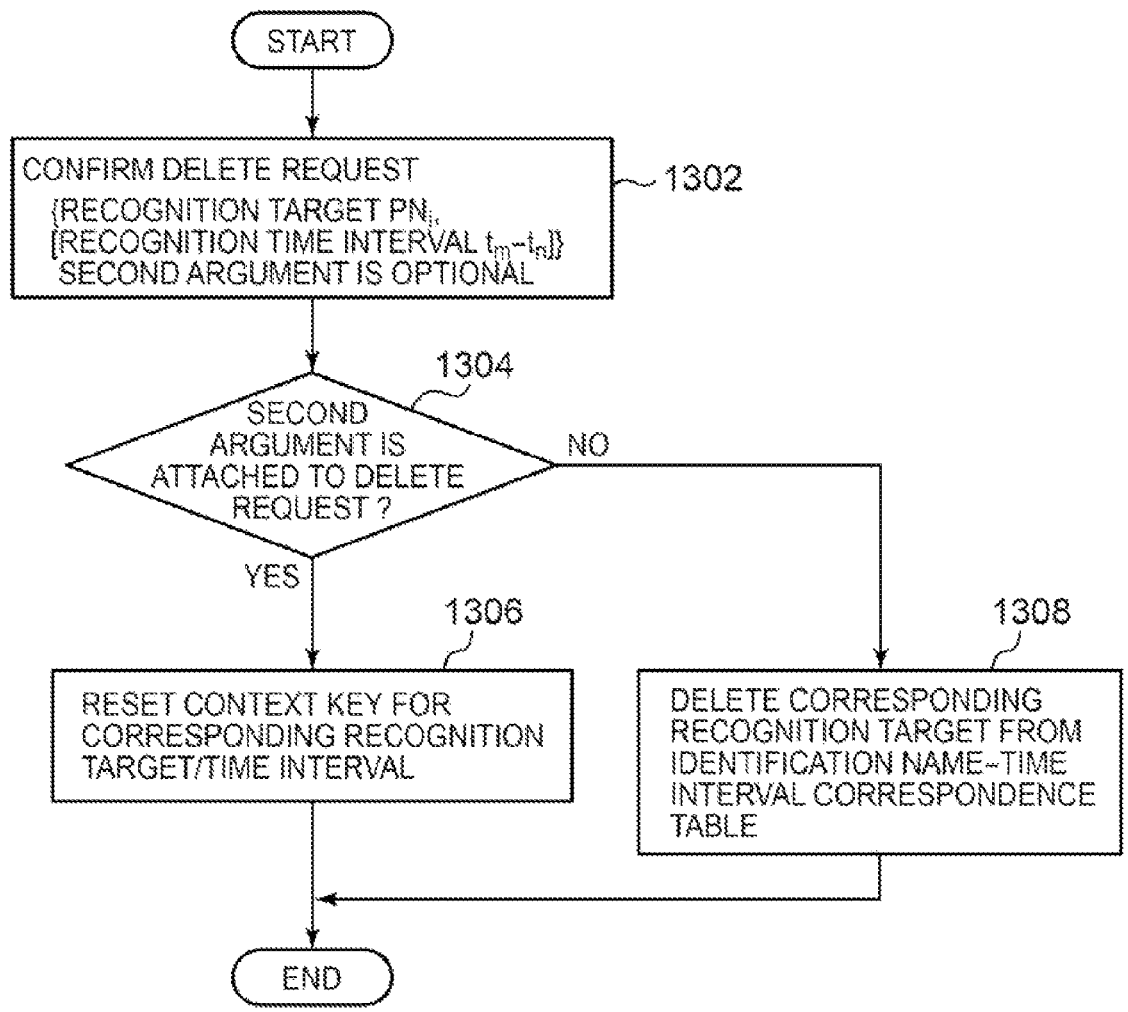
FIG. 13 is a flowchart of key deletion processing according to an embodiment of the present invention.

Referring next to the flowchart of FIG. 13, processing 4 (processing upon deletion of a recognition target) will be described. Processing 4 is started by the key deletion module 516 in response to an operation performed by the operator of the computer 130.

In step 1302, the key deletion module 516 receives arguments {recognition target PNi,[recognition time interval tm-tn]}. Note that the second argument is optional.

In step 1304, the key deletion module 516 determines whether there is no argument in the recognition time interval, and if there is no argument, the key deletion module 516 instructs the robot 110 in step 1306 to delete a corresponding recognition target from the real name-identification name correspondence table 310. In addition, the corresponding recognition target is also deleted from the identification name-key correspondence table cache 520. If there is any argument in the recognition time interval, the key deletion module 516 gives an instruction in step 1308 to delete a corresponding recognition target time interval from the real name-identification name correspondence table 310. In addition, the corresponding recognition target time interval is also deleted from the identification name-time interval correspondence table cache 518 and the identification name-key correspondence table cache 520. Note that only the context key of the corresponding recognition target time interval is actually deleted.

This makes the context key of the corresponding recognition target time interval no longer available. Since a corresponding encrypted primary context existing in the disk drive 150 cannot be restored any longer, it becomes equivalent to non-existence in actuality.

Such key deletion is performed in response to a request from a privacy-minded individual to delete all records, for a certain reason that a project to which the individual belongs has changed, the individual is transferred to another section, or the individual has retired, or when it has been found that a person should not be recorded in the first place like a VIP or a patron.

Figure 17:
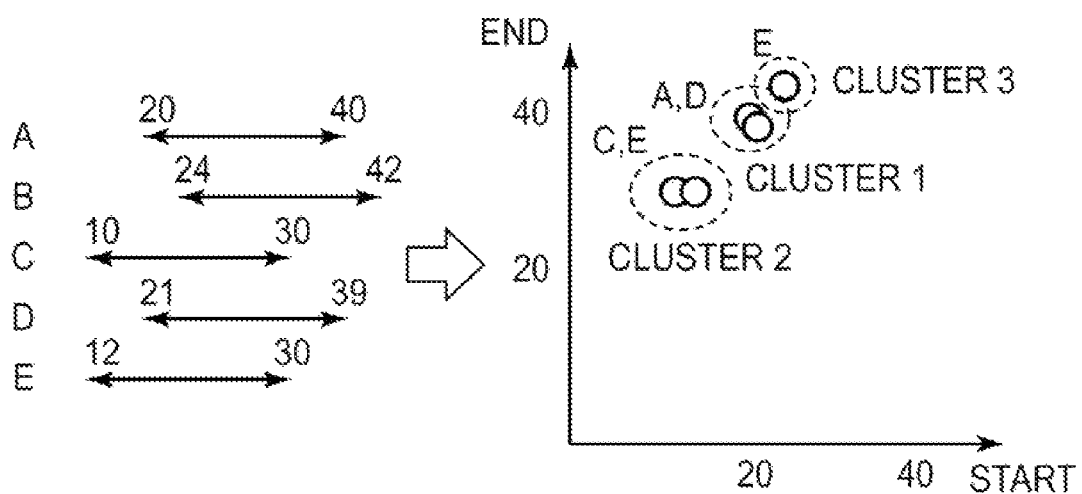
FIG. 17 is a diagram showing an example of clustering processing for estimating a high-order context according to an embodiment of the present invention.

Referring next to FIG. 17, context estimation processing will be described. As shown, this context estimation processing is performed in such a manner that each target A, B, C, D, E is placed in a coordinate system with the starting time on the X-axis and the ending time on the Y-axis, and clustered by a method like K-means using the Euclidean distance as distance. If targets belong to the same cluster, they will be identified to have a Meet relationship. In the example of FIG. 17, high-order contexts as Meet (A,D) and Meet (C,E) are estimated.

In the aforementioned embodiment, a primary context recognized by a single robot is used, but primary contexts from two or more robots can also be manipulated. In such a case, a coordinated context key is generated according to a Diffie-Hellman key-sharing algorithm to share the coordinated context key among the two or more robots so that encryption/decryption in the aforementioned embodiment can be performed in the same manner using the coordinated context key.

More specifically, suppose that a first robot and a second robot agree to generate a coordinated context key. In this case, the condition of agreement is target, time, location, or the like. For example, the recognition target is Alice, the time restriction is ten minutes from now, the location restriction is a ten-kilometer radius or less, etc.

Therefore, after the agreement, the first robot and the second robot generate an agreed entry in the real name-identification name correspondence table, respectively, to generate context keys as well. For example, the context key generated by the first robot is K_R1_Alice and the context key generated by the second robot is K_R2_Alice.

Next, the first robot and the second robot cooperate with each other to decide on a large prime number p and a natural number g smaller than the prime number p.

Next, the first robot calculates the following yR1 and sends it to the second robot:

$yR1 = g\hat{\ }K\_R1\_Alice \bmod p.$

Further, the second robot calculates the following yR2 and sends it to the first robot:

$yR2 = g\hat{\ }K\_R2\_Alice \bmod p.$

Thus, the first robot calculates the following:

$K\_R1\text{-}R2\_Alice = yR2\hat{\ }K\_R1\_Alice \bmod p.$

Further, the second robot calculates the following:

$K\_R2\text{-}R1\_Alice = yR1\hat{\ }K\_R2\_Alice \bmod p.$

As easily seen, K_R1-R2_Alice and K_R2-R1_Alice are identical, and this means that the coordinated context key has been shared. After that, when a coordinated context is encrypted, K_R1-R2_Alice or K_R2-R1_Alice is used. It is preferred that a field should be added to the real name-identification name correspondence table for each robot to store the coordinated context key therein.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, the cryptographic algorithm for a context key is not limited to AES, and any encryption method that meets a predetermined cipher strength, such as DES, can be employed.

What is claimed is:

1. A system for generating contexts of targets to estimate a high-order context from a plurality of contexts, the system comprising:
   a detection device comprising: a sensor for detecting a first target; a module for extracting, from feature data detected by said sensor, said first target and a first primary context of said first target, wherein said first primary context of said first target indicates a presence of said first target at a given location during a given time interval; and a module for encrypting said primary first context with a key corresponding to said first target;
   a storage device for recording the encrypted first primary context from said detection device; and
   a processing device comprising: a module for receiving said first encrypted primary context from said storage device; a module for receiving said key corresponding to said first target involved in said first encrypted primary context; a module for decrypting said first encrypted primary context using the received key; and a module for estimating a high-order context using said decrypted first primary context by comparing the decrypted first primary context of said first target with primary contexts of one or more other of the targets to determine whether said first target and the one or more other targets share the given location as a common location during the given time interval;
   wherein said processing device further comprises a module for requesting said detection device to delete information on a key corresponding to a specific target.

2. The system according to claim 1, wherein:
   said detection device is a robot; and
   said sensor comprises an image sensor and a microphone.

3. The system according to claim 1, wherein said detection device further comprises a first correspondence table comprising entries of a real name of said first target, an identification name of said first target, and said key corresponding to said first target.

4. The system according to claim 3, wherein said detection device further comprises a second correspondence table comprising entries of a time interval of said first primary context and an identification name of said first target associated with said first primary context.

5. The system according to claim 4, wherein information on said time interval of said first primary context is added in an unencrypted format to information on said encrypted first primary context sent from said detection device to said storage device.

6. The system according to claim 5, wherein said module for receiving said encrypted primary context from said storage device makes an inquiry to said storage device during said time interval of said primary context.

7. The system according to claim 1, wherein:
encryption is of an AES encryption type; and
said key is 128 bits.

8. The system according to claim 1, further comprising a plurality of said detection devices, each of said detection devices further comprising:

a module for creating a coordinated context key for a target detected by another detection device from said plurality of said detection devices under a predetermined condition; and a module for encrypting a context corresponding to said predetermined condition by using said coordinated context key.

9. The system according to claim 1, wherein said storage device is offered by a cloud computing storage service.

10. The system according to claim 1, wherein the module for estimating the high-order context is configured to compare the decrypted first primary context of said first target with the primary contexts of the one or more other targets using a clustering process based on a starting time and an ending time the targets are present at the common location, wherein targets belonging to a same cluster are identified as having a meet relationship.

* * * * *